Feb. 5, 1929.

I. M. ASKREN 1,701,486

WHEELBARROW

Filed Nov. 22, 1926  2 Sheets-Sheet 1

WITNESS:
R. C. Thomas

I. M. Askren
INVENTOR
BY Victor J. Evans
ATTORNEY

Feb. 5, 1929.
I. M. ASKREN
1,701,486
WHEELBARROW
Filed Nov. 22, 1926   2 Sheets-Sheet 2
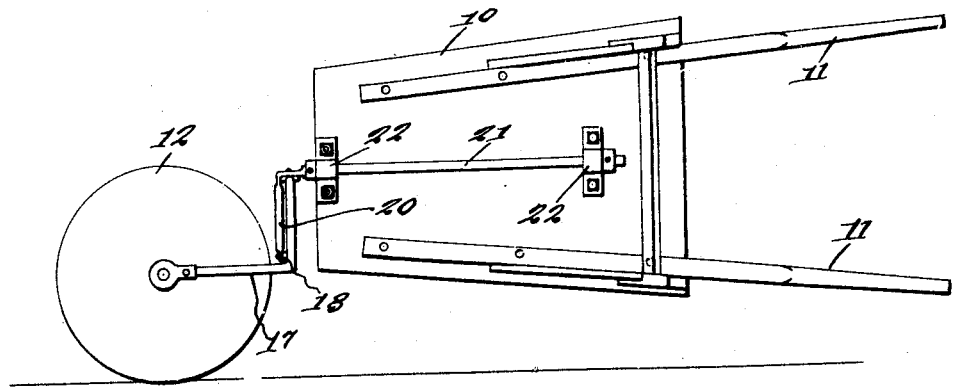
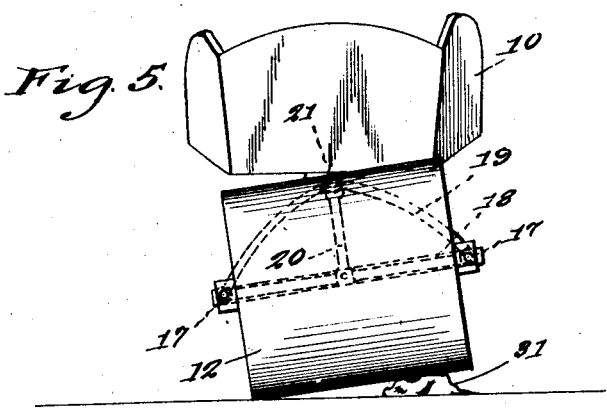
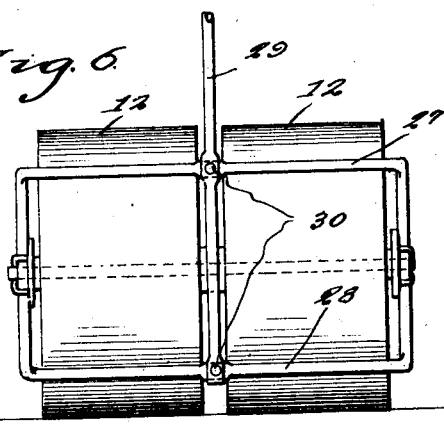
I. M. Askren INVENTOR Patented Feb. 5, 1929.

1,701,486

UNITED STATES PATENT OFFICE.

ISAAC M. ASKREN, OF PHOENIX, ARIZONA.

WHEELBARROW.

Application filed November 22, 1926. Serial No. 150,086.

This invention relates to wheelbarrows, and contemplates provision of means for supporting the wheel for oscillating rocking movement, so that the body of the wheelbarrow can be always maintained in a true horizontal position when moving the same over a rough or irregular surface, thereby facilitating moving the wheelbarrow over soft or irregular territory, and at the same time to allow the wheel to pass over small obstructions without transmitting twisting or torsional movements to the body of the wheelbarrow.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 4 is a view of the construction shown in Figure 2 showing how the wheelbarrow can be dumped or emptied without interfering with the position of the wheel with relation to the ground.

Figure 5 is a front elevation of the structure shown in Figure 2 showing how the wheel is allowed to rock or oscillate when passing over an obstruction without transmitting similar motion to the body.

Figure 6 is a plan view of another form of the invention showing the use of a pair of wheels in contradistinction to the single wheel used in the other forms of the invention.

Figure 1:
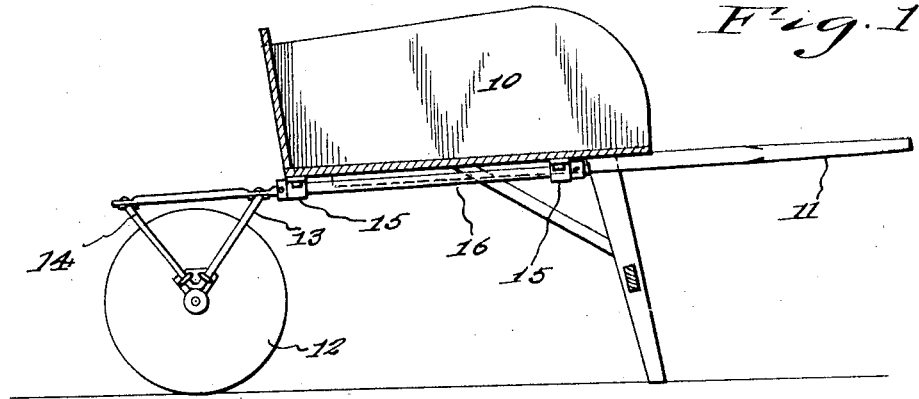
Figure 1 is a side elevation with the body of the wheelbarrow in section, showing one embodiment of the invention.

Referring to the drawings in detail and particularly Figure 1, 10 indicates the body of a wheelbarrow of any well known construction, the handles of which are indicated at 11 and a ground engaging wheel at 12. This wheel in addition to the wheels used in all forms of the invention is of drum-like contour, thereby presenting a relatively wide peripheral surface to the ground. Furthermore in each form of the invention the wheel or wheels are supported for rocking or oscillatory movement with relation to the body of the wheelbarrow, so that the wheel is allowed to move laterally independently of the body, when the wheelbarrow is pushed over soft or irregular territory, thus preventing the body from being subjected to twists or torsional strain, which usually makes it very difficult for a person to push a wheelbarrow over territory of the character above mentioned. At the same time this construction permits the wheelbarrow to be quickly and conveniently dumped in the manner illustrated in Figure 4, without disturbing the normal position of the wheel with relation to the ground. In Figure 1 the wheel 12 is journaled in a suitable frame arranged above the wheel and including divergently disposed members 13 and 14 respectively, which extend downwardly at the ends of the wheel as illustrated. Arranged on the under side of the body of the wheelbarrow are spaced bearings 15, and journaled in these bearings is a shaft 16, the latter projecting in advance of the forward end of the wheelbarrow and secured in any suitable manner to the respective members 13 and 14 of the frame in which the wheel 12 is journaled.

Figure 2:
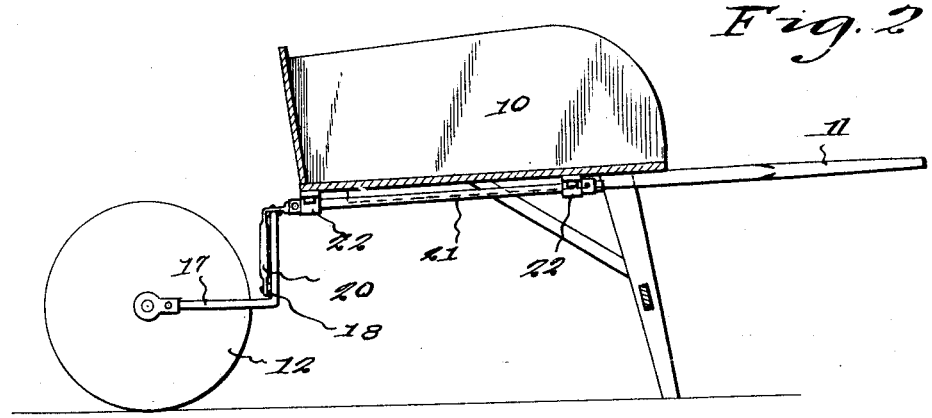
Figure 2 is a similar view of a modified form.

In Figure 2 I have shown a modified form of the invention, which embodies all of the essential features hereinabove outlined, but which is distinguished from the form shown in Figure 1, in the construction and mounting of the frame for the ground wheel 12. In this form of the invention the frame is arranged at the rear of the wheel 12, and includes spaced parallel members 17 between which the wheel 12 is journaled, and also includes a straight bar 18 which is terminally connected with the arch-shaped bar 19 as clearly illustrated in Figure 5. Both of these bars are connected with the down turned extremity 20 of the shaft 21 which is arranged longitudinally beneath the body 10 of the wheelbarrow and journaled in suitable bearings 22.

Figure 3:
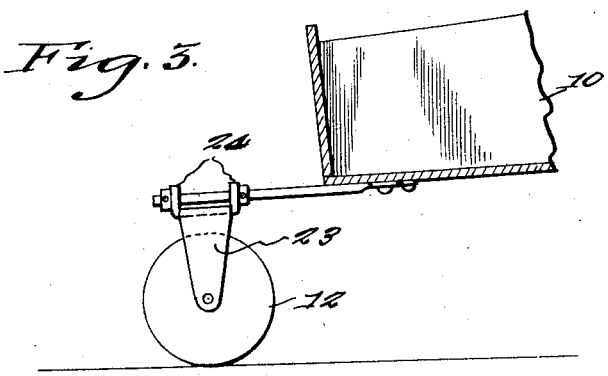
Figure 3 is a similar fragmentary view of another modified form.
Figure 7:
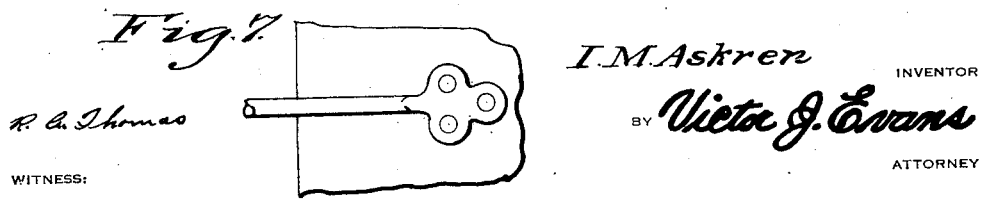
Figure 7 is a fragmentary bottom plan view of Figure 3.

In Figure 3 I have illustrated another modified form of the invention, wherein the ground engaging wheel 12 is journaled in a substantially inverted U-shaped frame and between the parallel side members 23 thereof, the frame being provided with upturned apertured lugs 24 in which the forward end of the shaft 25 is journaled. This shaft extends beneath the body 10 of the barrow, and is reinforced and shaped to form a solid connection thereto. This form gives the same free action to the wheel and body as the others.

In Figure 6 I have shown the use of two ground engaging wheels indicated at 12, which are journaled in a frame substantially of the same construction as that illustrated in Figure 1, the frame including members 27 and 28 respectively which are arranged in divergent relation at the ends of the wheel 12 to accommodate the axle therefor. The wheels are slightly spaced apart, and arranged in the space between said wheels is the shaft 29, which is suitably connected to the members 27 and 28 of the frame as at 30. This shaft 29 is adapted to be journaled beneath the bottom of the body of the wheelbarrow in the same manner as described in connection with the other forms of the invention.

I have illustrated in Figure 5 the manner in which the wheel or wheels of the wheelbarrow are allowed to rock or oscillate when passing over an obstruction indicated at 31, the wheel or wheels moving in this manner without transmitting any twisting or torsional strain to the body 10, thus relieving the user of the unnecessary strain and difficulty generally encountered under such conditions. The wheel or wheels can move in the manner stated in either direction, and will automatically right themselves after passing over an obstruction as will be readily understood. Then again when it is desired to empty or dump the wheelbarrow, the body of the latter can be turned as indicated in Figure 4, independently of the wheel or wheels 12.

While it is believed that from the foregoing description the nature and advantages of the invention will be readily apparent, I desire to have it understood, that I do not limit myself to what is herein shown and described and that such changes may be resorted to when desired as fall within the scope of what is claimed.

What is claimed is:

A wheelbarrow comprising a body portion, an inverted substantially U-shaped frame arranged in advance of said body, spaced apertured lugs rising from the opposed edges of the frame, a ground engaging cylinder journaled in the frame, and a shaft secured to the bottom of said body portion and received by said apertured lugs, whereby the frame and cylinder are mounted on the rod to oscillate as a unit with relation to the body portion.

In testimony whereof I affix my signature.

ISAAC M. ASKREN.